(12) United States Patent
Wang et al.

(10) Patent No.: US 12,265,842 B2
(45) Date of Patent: Apr. 1, 2025

(54) METHOD FOR PROCESSING INFORMATION

(71) Applicant: BEIJING BAIDU NETCOM SCIENCE TECHNOLOGY CO., LTD., Beijing (CN)

(72) Inventors: Haifeng Wang, Beijing (CN); Hua Wu, Beijing (CN); Hao Tian, Beijing (CN); Jing Liu, Beijing (CN); Hongyu Li, Beijing (CN); Yingqi Qu, Beijing (CN); Qifei Wu, Beijing (CN)

(73) Assignee: BEDING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/817,035

(22) Filed: Aug. 27, 2024

(65) Prior Publication Data

US 2024/0419484 A1 Dec. 19, 2024

(30) Foreign Application Priority Data

Dec. 20, 2023 (CN) .......................... 202311763568.4

(51) Int. Cl.
*G06F 9/48* (2006.01)
*G06F 9/50* (2006.01)

(52) U.S. Cl.
CPC .............. *G06F 9/4843* (2013.01); *G06F 9/48* (2013.01); *G06F 9/4806* (2013.01); *G06F 9/4881* (2013.01); *G06F 9/50* (2013.01); *G06F 9/5005* (2013.01); *G06F 9/5061* (2013.01); *G06F 9/5072* (2013.01); *G06F 9/5077* (2013.01)

(58) Field of Classification Search
CPC ........ G06F 9/48; G06F 9/4806; G06F 9/4843; G06F 9/4881; G06F 9/50; G06F 9/5005; G06F 9/5061; G06F 9/5072; G06F 9/5077
See application file for complete search history.

(56) References Cited

U.S. PATENT DOCUMENTS

| 11,966,783 | B1* | 4/2024 | Lin | ........................ G06F 9/4881 |
| 2013/0346988 | A1* | 12/2013 | Bruno | .................. G06F 9/5066 718/102 |
| 2014/0215477 | A1* | 7/2014 | Chen | ..................... G06F 9/5066 718/102 |
| 2018/0121783 | A1* | 5/2018 | Hu | ......................... G06N 5/027 |

(Continued)

FOREIGN PATENT DOCUMENTS

| CN | 116450917 A | 7/2023 |
| CN | 117193582 A | 12/2023 |

*Primary Examiner* — Charles M Swift
(74) *Attorney, Agent, or Firm* — MASCHOFF BRENNAN; Younghwan Lee; Liang Huang (57) ABSTRACT

A method for processing information is provided. The method includes obtaining input information to be processed. The method further includes determining execution information associated with processing of the input information. The execution information includes at least one of memory information to be retrieved or tool information to be invoked. The method further includes obtaining, by using the execution information, at least one piece of processing result information corresponding to the processing of the input information. The method further includes the at least one piece of processing result information to generate output information for feedback.

18 Claims, 4 Drawing Sheets

(56) References Cited

U.S. PATENT DOCUMENTS

| | | |
|---|---|---|
| 2018/0285445 A1* | 10/2018 | Lu .......................... G06F 3/167 |
| 2019/0065625 A1 | 2/2019 | Shinn et al. |
| 2021/0042661 A1* | 2/2021 | St-Onge ................. G06N 3/126 |
| 2021/0055955 A1* | 2/2021 | Yankelevich ........ G06Q 10/103 |
| 2021/0294585 A1* | 9/2021 | Lee ........................ G06N 3/105 |

* cited by examiner

METHOD FOR PROCESSING INFORMATION

CROSS REFERENCE TO RELATED APPLICATION

This application claims priority to Chinese Patent Application No. 202311763568.4 filed on Dec. 20, 2023, the contents of which are hereby incorporated by reference in their entirety for all purposes.

TECHNICAL FIELD

The present disclosure relates to the technical field of artificial intelligence (AI), and in particular, to the fields of large language models (LLMs), AI agents, and the like. Specifically, the present disclosure relates to an artificial intelligence-based information processing method and apparatus, an electronic device, a computer-readable storage medium, a computer program product, and an AI agent.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include the technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

Recently, with the continuous progress of large language models, capabilities of AI in aspects such as language understanding, knowledge memorizing, and logical reasoning are greatly improved, providing a strong support for the development of AI agents. An AI agent is an advanced artificial intelligence system using the large language model as a core reasoning engine, which not only has language understanding and generation capabilities of the large language model, but also can efficiently and flexibly solve various complex problems, thereby further releasing machine intelligence contained in the large language model, and providing a user with a more accurate and more personalized service.

Methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides an artificial intelligence-based information processing method and apparatus, an electronic device, a computer-readable storage medium, a computer program product, and an AI agent.

According to an aspect of the present disclosure, an artificial intelligence-based information processing method is provided, including obtaining input information to be processed; determining execution information associated with processing of the input information, wherein the execution information includes at least one of memory information to be retrieved or tool information to be invoked; obtaining, by using the execution information, at least one piece of processing result information corresponding to the processing of the input information; and integrating the at least one piece of processing result information to generate output information for feedback.

According to another aspect of the present disclosure, an electronic device is provided, including at least one processor; and a memory communicatively connected to the at least one processor, wherein the memory stores instructions executable by the at least one processor, and the instructions, when executed by the at least one processor, cause the at least one processor to perform the method described above.

According to another aspect of the present disclosure, a non-transitory computer-readable storage medium storing computer instructions is provided, wherein the computer instructions are used to cause a computer to perform the method described above.

It should be understood that the content described in this section is not intended to identify critical or important features of the embodiments of the present disclosure, and is not used to limit the scope of the present disclosure. Other features of the present disclosure will be readily understood with reference to the following description.

BRIEF DESCRIPTION OF THE DRAWINGS

The accompanying drawings show exemplary embodiments and form a part of the specification, and are used to explain exemplary implementations of the embodiments together with a written description of the specification. The embodiments shown are merely for illustrative purposes and do not limit the scope of the claims. Throughout the accompanying drawings, the same reference numerals denote similar but not necessarily same elements.

DETAILED DESCRIPTION

Exemplary embodiments of the present disclosure are described below in conjunction with the accompanying drawings, where various details of the embodiments of the present disclosure are included to facilitate understanding, and should only be considered as exemplary. Therefore, those of ordinary skill in the art should be aware that various changes and modifications can be made to the embodiments described here, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one element from the other. In some examples, a first element and a second element may refer to a same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed terms.

In the related art, an existing AI agent is still in a fairly early stage of development, and there is no uniform standard for design of an agent mechanism related to the AI agent. Currently, most of AI agents that emerge in the industry are still in proof-of-concept and preliminary exploration stages.

For example, an existing AI agent usually has the following problems:

First, an overall architecture of the AI agent has a problem that granularity of module design is excessively coarse or fine. If module granularity is excessively coarse, a single module may bear excessive cognitive burdens, resulting in limitation of gains that the AI agent can bring compared to a large language model. However, if module granularity is excessively fine, a task solving chain may be excessively long, and a cumulative error increases. In this case, a language understanding capability of the large language model cannot be effectively played.

Then, excessive manually set rules are usually added to the AI agent to adapt to a specific problem in a specific type of scenario. However, when a problem that has never occurred before is encountered, this design relying on the preset rules may limit a capability of the AI agent to adapt to an unknown environment, making the AI agent unable to flexibly adjust a strategy and resulting in poor generalization performance in practical applications.

In addition, specific function implementation of the AI agent is not comprehensive enough. Some AI agents use a vector database to simulate memory storage functions of human brains, and store all historical interaction behaviors in the vector database. This may seemingly achieve lossless long-term memory, but the AI agent may be unable to extract reusable and abstract experience from a series of conversations, tasks, or events. Consequently, the AI agent may only perform recording but cannot perform summarization, resulting in a performance bottleneck in memory.

In addition, the AI agent lacks a more advanced cognitive capability, for example, a reflection capability. Even if a currently obtained result already meets a basic requirement of a task, this may not be a capability upper limit of the AI agent.

In view of at least one of the above problems, the embodiments of the present disclosure provide an artificial intelligence-based information processing method and an AI agent.

Before the method in the embodiments of the present disclosure is described in detail, an example system in which the method described herein may be implemented is described with reference to FIG. 1.

Figure 1:
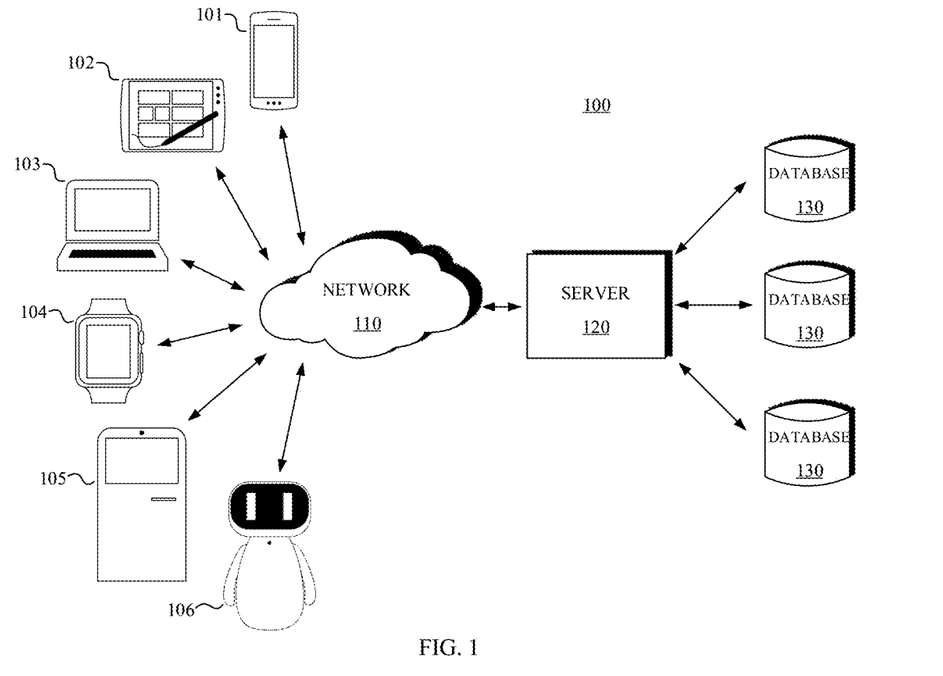
FIG. 1 is a schematic diagram of an example system in which various methods described herein can be implemented according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communication networks 110 that couple the one or more client devices to the server 120. The client devices 101, 102, 103, 104, 105, and 106 may be configured to execute one or more applications.

In this embodiment of the present disclosure, the server 120 may run to execute one or more services or software applications of an artificial intelligence-based information processing method or an AI agent.

In some embodiments, the server 120 may further provide other services or software applications that may include a non-virtual environment and a virtual environment. In some embodiments, these services may be provided as web-based services or cloud services, for example, provided to a user of the client devices 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. The user operating the client devices 101, 102, 103, 104, 105, and/or 106 may sequentially use one or more client applications to interact with the server 120, to use the services provided by these components. It should be understood that various different system configurations are possible, and may be different from that of the system 100. Therefore, FIG. 1 is an example of the system for implementing various methods described herein, and is not intended to be limiting.

The user may use the client devices 101, 102, 103, 104, 105, and/or 106 to provide information for interacting with the AI agent. The client device may provide an interface that enables the user of the client device to interact with the client device. The client device may also output information to the user via the interface. Although FIG. 1 shows only six client devices, those skilled in the art will understand that any number of client devices are supported in the present disclosure.

The client devices 101, 102, 103, 104, 105, and/or 106 may include various types of computer devices, such as a portable handheld device, a general-purpose computer (such as a personal computer and a laptop computer), a workstation computer, a wearable device, a smart screen device, a self-service terminal device, a service robot, a gaming system, a thin client, various messaging devices, and a sensor or other sensing devices. These computer devices can run various types and versions of software applications and operating systems, such as MICROSOFT Windows, APPLE IOS, a UNIX-like operating system, and a Linux or Linux-like operating system (e.g., GOOGLE Chrome OS); or include various mobile operating systems, such as MICROSOFT Windows Mobile OS, iOS, Windows Phone, and Android. The portable handheld device may include a cellular phone, a smartphone, a tablet computer, a personal digital assistant (PDA), etc. The wearable device may include a head-mounted display (such as smart glasses) and other devices. The gaming system may include various handheld gaming devices, Internet-enabled gaming devices, etc. The client device can execute various applications, such as various Internet-related applications, communication applications (e.g., email applications), and short message service (SMS) applications, and can use various communication protocols.

The network 110 may be any type of network well known to those skilled in the art, and may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a blockchain network, a public switched telephone network (PSTN), an infrared network, a wireless network (such as Bluetooth or Wi-Fi), and/or any combination of these and/or other networks.

The server 120 may include one or more general-purpose computers, a dedicated server computer (for example, a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures related to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above operating systems and any commercially available server operating system. The server 120 can also run any one of various additional server applications and/or middle-tier applications, including an HTTP server, an FTP server, a CGI server, a JAVA server, a database server, etc.

In some implementations, the server 120 may include one or more applications to analyze and merge data feeds and/or event updates received from users of the client devices 101, 102, 103, 104, 105, and/or 106. The server 120 may further include one or more applications to display the data feeds and/or real-time events via one or more display devices of the client devices 101, 102, 103, 104, 105, and/or 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be configured to store information such as an audio file and a video file. The databases 130 may reside in various locations. For example, a database used by the server 120 may be locally in the server 120, or may be remote from the server 120 and may communicate with the server 120 via a network-based or dedicated connection. The database 130 may be of different types. In some embodiments, the database used by the server 120 may be, for example, a relational database. One or more of these databases can store, update, and retrieve data from or to the database, in response to a command.

In some embodiments, one or more of the databases 130 may also be used by an application to store application data. The database used by the application may be of different types, for example, may be a key-value repository, an object repository, or a regular repository backed by a file system.

The system 100 of FIG. 1 may be configured and operated in various manners, such that various methods described according to the present disclosure can be applied.

The following describes in detail aspects of an artificial intelligence-based information processing method and an AI agent according to the embodiments of the present disclosure with reference to the accompanying drawings.

Figure 2:
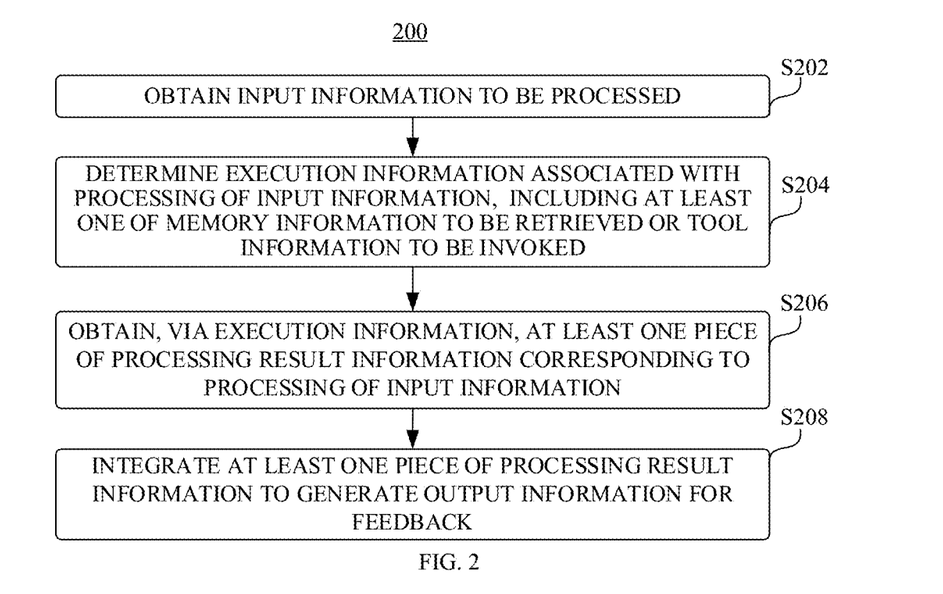
FIG. 2 is a flowchart of an artificial intelligence-based information processing method according to an embodiment of the present disclosure.

FIG. 2 is a flowchart of an artificial intelligence-based information processing method 200 according to an embodiment of the present disclosure.

In this embodiment of the present disclosure, the artificial intelligence-based information processing method 200 may be performed by an AI agent. For example, the AI agent may execute the artificial intelligence-based information processing method 200 in a process of interacting with a user or an external environment.

As shown in FIG. 2, the method 200 includes steps S202, S204, S206, and S208.

In step S202, input information to be processed is obtained.

In an example, the input information may include query information, request information, instruction information, signal information, data information, and the like. The input information may be provided by the user in a process of interacting with the AI agent, or may be obtained by the AI agent by perceiving the external environment. In application scenarios such as an intelligent photo album manager, an intelligent voice assistant, and an intelligent cabin, the input information may include, such as a photo, a video, voices, texts, and sensor data of a vehicle. In addition, the input information may also include context information such as time, a location, an object, and a situation.

In step S204, execution information associated with processing of the input information is determined. The execution information includes at least one of memory information to be retrieved or tool information to be invoked.

In an example, the execution information may refer to information that the AI agent needs to additionally use, utilize, or employ in order to process the input information. In one case, the AI agent may determine that only the memory information needs to be retrieved in order to process the input information. In another case, the AI agent may determine that only the tool information needs to be invoked in order to process the input information. In still another case, the AI agent may determine that the memory information needs to be retrieved as well as the tool information needs to be invoked in order to process the input information.

That is, the AI agent according to this embodiment of the present disclosure has a planning capability to determine what appropriate execution information is to be used to process the input information.

In an example, the memory information may refer to memory content possessed by the AI agent. The memory information may be stored in a form of a vector database. In addition, the memory information may also be maintained for personalized content such as a user profile and a user preference of a specific user.

That is, the AI agent according to this embodiment of the present disclosure further has a memory storage capability.

In an example, the tool information may refer to a name or a type of a tool that the AI agent can use, connect to, or access. The tool is, for example, a calculator for performing a mathematical operation, a retrieval engine for performing retrieving, or a python language for performing data analysis.

That is, the AI agent according to this embodiment of the present disclosure further has an operation capability.

In step S206, at least one piece of processing result information corresponding to the processing of the input information is obtained by using the execution information.

In an example, if the AI agent determines that the memory information needs to be retrieved, a query vector may be generated as an input to a memory retriever, to output, via the memory retriever, one or more pieces of related memory information retrieved from all memory information possessed by the AI agent. In this case, obtaining the at least one piece of processing result information corresponding to the processing of the input information by using the memory information may include: obtaining at least one memory information retrieving result by retrieving the memory information related to the input information.

In an example, if the AI agent determines that the tool information needs to be invoked, the AI agent may first quickly find potentially useful candidate tool information by using a lightweight vector retriever, and then determine one or more pieces of related tool information from the candidate tool information, thereby quickly finding appropriate tool information from a large amount of tool information.

In an example, when the tool information is invoked to process the input information, a corresponding usage parameter may be filled in according to a usage instruction of the tool information, so that the input information is processed by using the tool information. In this case, obtaining the at least one piece of processing result information corresponding to the processing of the input information by using the tool information may include: completing the processing of the input information by using the tool information, to obtain at least one tool information invoking result. For example, the calculator is used to calculate a mathematical formula provided by the user, python is used to perform data analysis on data provided by the user, or a search engine is used to forecast weather queried by the user.

That is, the AI agent according to this embodiment of the present disclosure has an action capability. After planning is completed, the AI agent may begin to take actions. In this embodiment of the present disclosure, the planning capability and the action capability of the AI agent may be similar to the concepts "plan" and "do" included in a PDCA (plan, do, check, act) cycle in management.

In step S208, the at least one piece of processing result information is integrated to generate output information for feedback.

In an example, an integration operation may refer to further processing the at least one piece of processing result information to generate feedback to the user (for example, a reply to the user) or feedback to the external environment (for example, an action or a response made to the external environment). For example, the integrating the at least one piece of processing result information may include: selecting one or more results from the at least one memory information retrieving result and/or the at least one tool information invoking result, or combining the at least one memory information retrieving result and/or the at least one tool information invoking result into a specific result. In this embodiment of the present disclosure, the integration operation may be changed according to an actual situation, or may be determined by an underlying reasoning capability of a large language model, which is not limited in the present disclosure.

In an example, the output information may be enabled, based on a scenario to which the method 200 is applied, to conform to a style in the scenario. For example, in voice scenarios such as a smart home, a warm, friendly, and conversational language may be used for reporting to the user. For another example, the output information may be made multi-modal, for example, output texts and images are interspersed to form an illustrated effect.

The artificial intelligence-based information processing method 200 according to this embodiment of the present disclosure provides a simple and effective AI agent mechanism to improve an intelligence degree of the AI agent. In the AI agent mechanism, a memory retrieving function and a tool invoking function of the AI agent are added. In addition, because the AI agent acts as a single initiator to initiate use of the memory information and/or the tool information and respectively receive corresponding use results through the planning capability in step S204 and the action capability in step S206, a control capability of the AI agent, including the planning capability and the action capability, focuses only on a main control function level, but does not redundantly incorporate an additional functional level of a memory storage capability and/or an operation capability while keeping no communication coupling between the memory storage capability and the operation capability. Therefore, a module function design with high cohesion and a communication mechanism design with low coupling are implemented, thereby simply and effectively improving the intelligence degree of the AI agent.

In addition, because the artificial intelligence-based information processing method 200 according to this embodiment of the present disclosure is not designed based on a specific or particular application scenario, a universal AI agent mechanism facing various application scenarios can be implemented. Therefore, the flexibility and the universality of the AI agent are further improved, and a customizable degree of the AI agent is enhanced.

In the technical solutions of the present disclosure, collection, storage, use, processing, transmission, provision, disclosure, etc. of user personal information involved all comply with related laws and regulations and are not against the public order and good morals.

Aspects of the artificial intelligence-based information processing method according to this embodiment of the present disclosure are further described in detail below.

Figure 3:
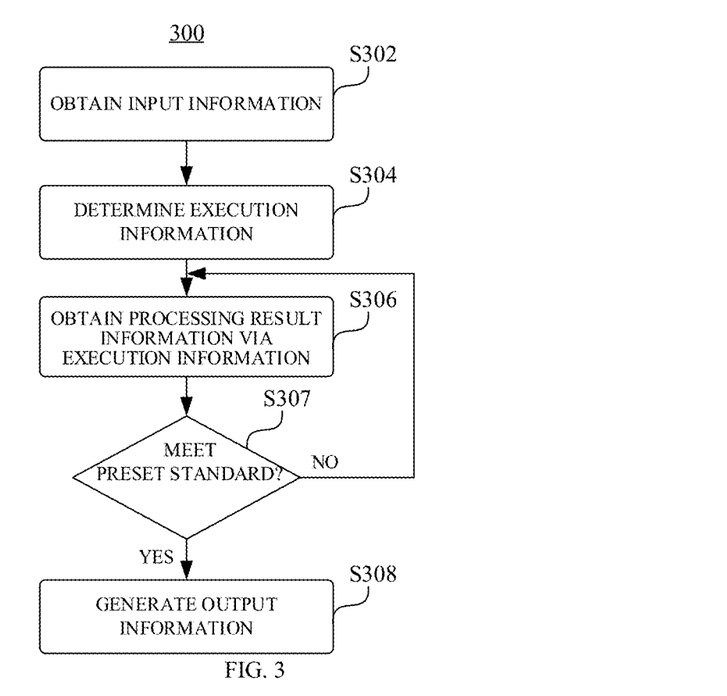
FIG. 3 is a flowchart of an artificial intelligence-based information processing method according to another embodiment of the present disclosure.

FIG. 3 is a flowchart of an artificial intelligence-based information processing method 300 according to another embodiment of the present disclosure.

As shown in FIG. 3, the method 300 may include steps S302, S304, S306, S307, and S308. Operations of steps S302, S304, S306, and S308 may be the same as those of steps S202, S204, S206, and S208 shown in FIG. 2. Therefore, details of these steps are omitted.

In step S302, input information to be processed may be obtained.

In step S304, execution information associated with processing of the input information may be determined. The execution information includes at least one of memory information to be retrieved or tool information to be invoked.

In step S306, at least one piece of processing result information corresponding to the processing of the input information may be obtained by using the execution information.

In step S307, whether the at least one piece of processing result information meets a preset standard may be determined. In an example, step S307 may be performed based on an underlying reasoning capability of a large language model.

On the one hand, in response to determining that the at least one piece of processing result information meets the preset standard ("Yes" shown in FIG. 3), the method 300 may proceed to step S308.

In step S308, the at least one piece of processing result information is integrated to generate output information for feedback.

On the other hand, in response to determining that the at least one piece of processing result information does not meet the preset standard ("No" shown in FIG. 3), the method 300 may return from step S307 to step S306, that is, the execution information is used to re-obtain the at least one piece of processing result information corresponding to the processing of the input information.

Then, whether the at least one piece of processing result information meets the preset standard may be determined again in step S307, so that the method 300 either proceeds to step S308 or returns to step S306 again to repeat the above process.

In an example, when the method 300 is applied to a retrieval-augmented scenario, the AI agent may dynamically change a search term in a search process based on a search result to obtain a result that best fits a user intention.

In this manner, the AI agent according to this embodiment of the present disclosure may have an evaluation capability. When obtaining the at least one memory information retrieving result and/or the at least one tool information invoking result, the AI agent may determine whether the result meets an expectation. The evaluation capability may ensure that the AI agent does not cause excessive error accumulation when dealing with a complex problem, or may prevent a task process from falling into an endless loop.

In addition, the AI agent according to this embodiment of the present disclosure may further have a reflection capability. When the AI agent determines that the at least one memory information retrieving result and/or the at least one tool information invoking result do/does not meet the expectation, the AI agent may correct a previous process of using the execution information (for example, may correct a usage parameter that is previously filled in when the tool information is invoked) to re-obtain a result.

As described above, in this embodiment of the present disclosure, a planning capability, an action capability, the evaluation capability, and the reflection capability of the AI agent may be similar to the concepts of plan, do, check, and act included in a PDCA cycle in management.

Therefore, in the artificial intelligence-based information processing method 300 according to this embodiment of the present disclosure, the control capability of the AI agent further includes the evaluation capability and the reflection capability, so that the AI agent can improve a capability upper limit through self-evaluation and self-reflection, thereby further improving an intelligence degree of the AI agent.

In some embodiments, because the input information may be multi-modal, step S202 shown in FIG. 2 or step S302 shown in FIG. 3 may include: converting the multi-modal input information into a uniform information format.

In this manner, the input information can be circulated losslessly in subsequent processing, thereby ensuring that the AI agent accurately performs a processing operation.

Figure 4:
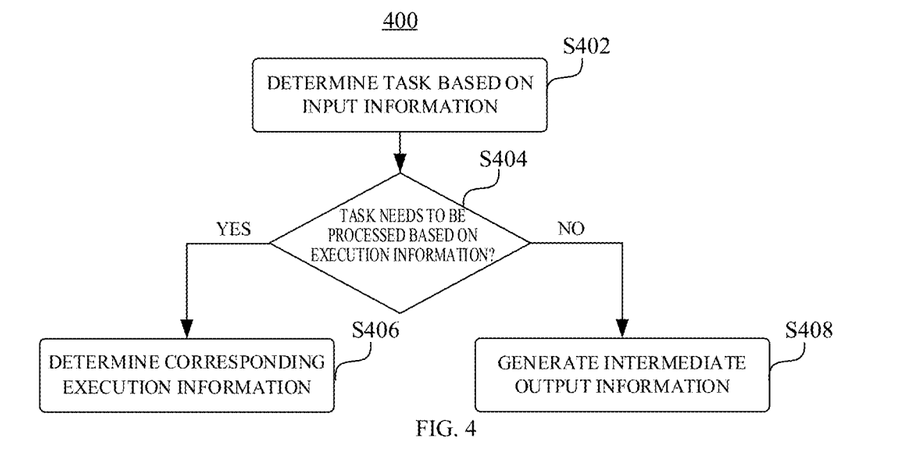
FIG. 4 is a flowchart of a process of determining execution information associated with processing of input information according to an embodiment of the present disclosure.

FIG. 4 is a flowchart of a process 400 of determining execution information associated with processing of input information according to an embodiment of the present disclosure.

In an example, the process 400 may correspond to step S204 shown in FIG. 2 or step S304 shown in FIG. 3.

As shown in FIG. 4, the process 400 may include steps S402, S404, and S406 or S408.

In step S402, at least one task associated with the processing of the input information may be determined based on the input information.

For each task of the at least one task, in step S404, whether the task needs to be processed based on the execution information may be determined.

In an example, the AI agent may first think whether the task needs to be processed by retrieving the memory information and/or invoking the tool information. This process may be performed based on the underlying reasoning capability of the large language model.

In some embodiments, in response to determining that the task needs to be processed based on the execution information, in step S406, execution information corresponding to the task may be determined. This process may be performed based on the underlying reasoning capability of the large language model.

In an example, the AI agent may determine, after thinking, whether the execution information corresponding to the task includes the memory information, the tool information, or both. If the AI agent determines that the execution information includes the tool information, the AI agent may further determine appropriate tool information that is required to process the task.

In this manner, when confronted with a complex problem (for example, when an answer cannot be obtained in a short time), the AI agent may decompose the complex problem to solve the complex problem through a series of tasks or subtasks. That is, the AI agent may have a capability to decompose the complex problem. In addition, the AI agent may further determine, through thinking, execution information applicable to the series of tasks, and therefore, comprehensively plan processing for the series of tasks. Further, the intelligence degree of the AI agent can be further improved.

In some embodiments, in response to determining that the task does not need to be processed based on the execution information, in step S408, intermediate output information obtained by processing the task may be generated. This process may be performed based on the underlying reasoning capability of the large language model.

In an example, the intermediate output information may include feedback to the user (for example, a reply to the user) or feedback to the external environment (for example, an action or a response made to the external environment). It may be understood that, because the intermediate output information is used for a specific task in the series of tasks, the intermediate output information is referred to as "intermediate" output information, and is different from the output information, relative to the input information, in step S208 shown in FIG. 2 or step S308 shown in FIG. 3.

In this manner, when the AI agent determines that a specific task can be processed without using additional execution information, the AI agent may directly generate the intermediate output information for feedback, so that the planning capability and the action capability of the AI agent are more flexible and coherent.

In some embodiments, if it is determined in step S307 of the method 300 shown in FIG. 3 that the at least one piece of processing result information does not meet the preset standard, the method 300 may also proceed to step S402 in the process 400 to redetermine the at least one task associated with the processing of the input information.

In this manner, the AI agent may determine a problematic task in the previous series of tasks by re-performing task decomposition, to return to a correct task and avoid entering a wrong solution path.

As described above, the AI agent according to this embodiment of the present disclosure may further have a memory storage capability, so that corresponding memory information is stored.

In some embodiments, the memory information may include working memory information. The working memory information may be configured to be associated with the task currently being processed.

In an example, as described above, the AI agent may decompose a complex problem to solve the complex problem through a series of tasks. When a specific task is currently being processed, the AI agent needs to losslessly store these memories closely related to a "present moment", to ensure completion of the current task with high quality.

In an example, action logs may be continuously generated when the AI agent interacts with the user or the external environment. For example, when receiving a query from the user, the AI agent needs to clearly remember specific details of a previous question of the user and a reply, to provide a coherent and logical reply. Therefore, the working memory information may be stored in an action log manner.

Therefore, a mechanism of the working memory information can ensure real-time memory content required by the AI agent to process the current task, and provide assurance for the AI agent to process the current task.

In some embodiments, the working memory information may be further configured to be associated with a processing status of each task of the at least one task.

In an example, when executing the series of tasks, the AI agent needs to clearly remember which tasks have been executed and which tasks have not been executed, thereby completely executing all of the series of tasks. Therefore, the AI agent further needs to store memories associated with the processing status of the task.

Therefore, the mechanism of the working memory information can further ensure the coherence and the integrity of the AI agent in solving the complex problem, and provide assurance for the AI agent to solve the complex problem.

In some embodiments, the memory information may include event memory information. The event memory information may be configured to be associated with a historical event.

In an example, the event memory information may be generated by the AI agent by abstracting a series of working memory information related to an "event" (for example, after the AI agent completes some consecutive tasks or completes discussion on a topic with the user). The event may include a cause, a process, and a result. Therefore, the event memory information may include an abstract formed by the AI agent for the working memory information related to the event.

In an example, the event memory information may be stored in the vector database for a long time. When the AI agent determines that a specific historical event needs to be recalled, the AI agent may invoke the memory retriever to find a related historical event for task processing. For example, the event may be encoded into a query vector, and when being queried, the event queried by the user is obtained by calculating a similarity between the query vector and a vector in the vector database.

Therefore, a mechanism of the event memory information may continue memories of the AI agent about a processed task, so that the AI agent can form experience related to the processed task, thereby further improving the intelligence degree.

In some embodiments, the memory information may include role memory information. The role memory information may be configured to be associated with a scenario to which the method in this embodiment of the present disclosure is applied, so that the generated output information conforms to a style in the scenario.

In an example, in different application scenarios, the AI agent may have different "personae". The role memory information may determine "self"-cognition of the AI agent and affect behaviors and communication manners of the AI agent in different scenarios. For example, in an application scenario of E-commerce recommendation, a persona of the AI agent may be generous and lively; in an application scenario of emotional companionship, a persona of the AI agent may be sympathetic and gentle; and in an application scenario of legal aid, a persona of the AI agent may be serious and professional. Correspondingly, the AI agent may give a reply to the user based on these different "personae", so that the output information replied to the user meets a current style.

Therefore, a mechanism of the role memory information can enable the AI agent to adjust a representation form of the AI agent based on different application scenarios, and enable the AI agent to better meet a user requirement, thereby establishing a deep relationship with the user.

In some embodiments, the memory information may include cognitive memory information. The cognitive memory information may be configured to be associated with a user who uses the method in this embodiment of the present disclosure, so that the generated output information meets a user profile of the user.

In an example, when there are enough events accumulated, the AI agent may abstract advanced cognition for the environment or the user from the events, and even form a personality or emotion unique to the AI agent, to form the cognitive memory information. For example, in a process in which the AI agent interacts with the user, if a plurality of events indicate that the user obviously has a stronger interest or preference for some topics, the AI agent may extract a unique user profile from the events and form a long-term memory, to better meet an interest and a habit of the user in subsequent interaction, so that the AI agent becomes increasingly more "understanding" of the user.

Therefore, a mechanism of the cognitive memory information can enable the AI agent to give full play to induction and reasoning capabilities, thereby further improving the intelligence degree.

As described above, the AI agent according to this embodiment of the present disclosure may further have an operation capability. The operation capability may be implemented through use of the tool information.

In some embodiments, the tool information may include: at least one of a plug-in tool, a function tool, an interface tool, or a model tool.

In an example, the calculator may be a plug-in tool, the retrieval engine may be an interface tool, the python language may be a function tool, and the large language model may be a model tool.

In an example, the AI agent may also be used as a model tool, and is invoked by another AI agent. Therefore, a multi-agent cooperative topology structure may be formed, to generate swarm intelligence. Therefore, the AI agent may have the operation capability through use of various types of tool information, thereby further improving the intelligence degree of the AI agent.

In some embodiments, the tool information may include a unified tool description specification.

In an example, the tool description specification specifies how a developer and a maintainer should define a function, a use method, and a return format of the tool information.

By defining the unified tool description specification for the different types of tool information, a problem of an invoking error or an invoking failure can be avoided, thereby providing efficient and stable communication for coupling between the control capability and the operation capability of the AI agent.

In some embodiments, the artificial intelligence-based information processing method (the method 200 shown in FIG. 2 or the method 300 shown in FIG. 3) in the embodiments of the present disclosure may be performed based on a reasoning capability of the large language model.

In an example, the step of determining the execution information associated with the processing of the input information in steps S204 and S304 (that is, the planning capability), the step of obtaining, by using the execution information, the at least one piece of processing result information corresponding to the processing of the input information in steps S206 and S306 (that is, the action capability), the step of determining whether the at least one piece of processing result information meets the preset standard in step S307 (that is, the evaluation capability), and the step of correcting, when the AI agent determines that the at least one memory information retrieving result and/or the at least one tool information invoking result do/does not meet the expectation, the previous process of using the execution information, to re-obtain the result (that is, the reflection capability) may be implemented based on underlying reasoning of the large language model.

In an example, steps S402, S404, and S406 in the process 400 shown in FIG. 4 may also be implemented based on underlying reasoning of the large language model.

Therefore, when executing the artificial intelligence-based information processing method, the AI agent in this embodiment of the present disclosure may further release, based on language understanding and generation capabilities of the large language model, machine intelligence contained in the large language model, thereby implementing more complex decision-making and solving a more complex problem.

An embodiment of the present disclosure further provides an AI agent, configured to execute the artificial intelligence-based information processing method described above.

An agent mechanism of the AI agent according to this embodiment of the present disclosure comprehensively covers a capability definition of the AI agent that is recognized by the industry, and functions of modules are highly unified, responsibilities of the modules are clearly divided, and a communication mechanism is simple and effective.

In addition, the agent mechanism of the AI agent according to this embodiment of the present disclosure is not designed based on a specific application scenario, but is a general agent mechanism applicable to various environments. Therefore, the agent mechanism has wide application scenarios, high flexibility, and a high customizable degree.

In addition, the agent mechanism of the AI agent according to this embodiment of the present disclosure incorporates an evaluation capability and a reflection capability into a control capability, thereby improving a capability upper limit of the AI agent. In addition, the concept "cognitive memory" is further provided, to give full play to induction and reasoning capabilities of the AI agent.

Figure 5:
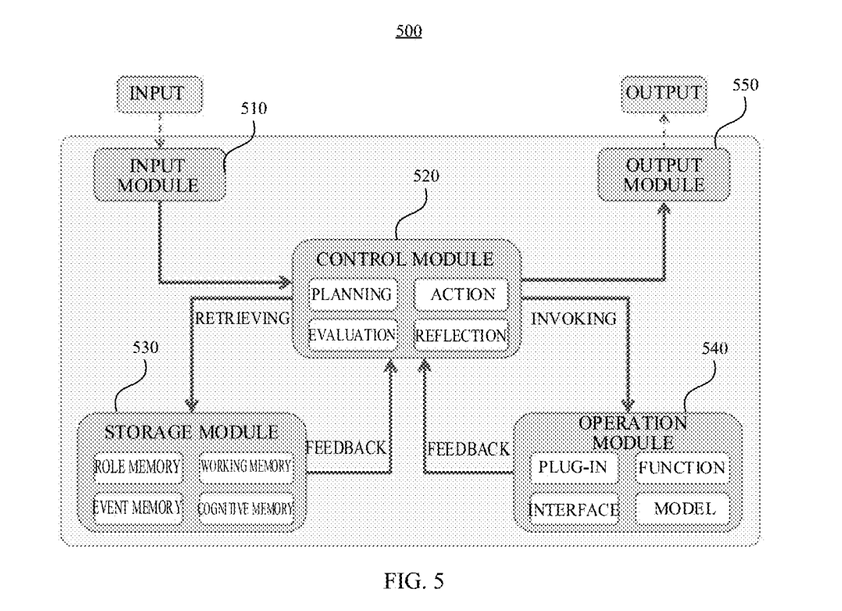
FIG. 5 is a schematic diagram of an AI agent according to an embodiment of the present disclosure.

FIG. 5 is a schematic diagram of an AI agent 500 according to an embodiment of the present disclosure.

In this embodiment of the present disclosure, inspired by the von Neumann structure in the modern computer theory, as shown in FIG. 5, the AI agent 500 may include five core modules: an input module 510, a control module 520, a storage module 530, an operation module 540, and an output module 550.

The input module 510 is responsible for receiving or perceiving information such as a query, a request, an instruction, a signal, or data from the outside world (for example, a user or an external environment) and converting the information into a format that the AI agent 500 can understand and process. The input module 510 is a primary phase of interaction between the AI agent 500 and the outside world. The input module 510 enables the AI agent 500 to efficiently and accurately obtain necessary "sensory" information from the outside world and respond to the information.

In an example, the input module 510 may execute step S202 in the method 200 shown in FIG. 2 or step S302 in the method 300 shown in FIG. 3.

The control module 520 is a core support for a capability of the AI agent 500 to process a complex task. A control capability of the control module 520 may include the following four aspects: a planning capability, an action capability, an evaluation capability, and a reflection capability.

In an example, the method 200 shown in FIG. 2 and the method 300 shown in FIG. 3 are used as examples, and the planning capability may correspond to step S204 or step S304. The action capability may correspond to step S206 or step S306. The evaluation capability may correspond to step S307. The reflection capability may correspond to the step of returning from step S307 to step S306 in the method 300 when it is determined that the at least one piece of processing result information does not meet the preset standard, to re-obtain, by using the execution information, the at least one piece of processing result information corresponding to the processing of the input information.

In an example, the control module 520 continuously interacts with the storage module 530, the operation module 540, and/or the output module 550 in a running process. However, it is noted that, in this embodiment of the present disclosure, the control module 520 initiates communication with the storage module 530, the operation module 540, and/or the output module 550 as a single initiator, but there is no communication coupling between the storage module 530, the operation module 540, and the output module 550.

In an example, performance of the control module 520 may be closely related to a large language model on which the AI agent 500 is based. To give full play to a capability of the large language model, an internal structure of the control module 520 may be designed to be highly configurable and extensible, to cope with different types of tasks and requirements in an actual scenario.

The storage module 530 may be responsible for memorizing information such as a history conversation and an event stream. The role memory information, the working memory information, the event memory information, and the cognitive memory information described above may be included in the storage module 530.

In an example, after obtaining the input information, the AI agent 500 may determine the execution information associated with the processing of the input information. When the execution information includes memory information, the AI agent 500 may retrieve related memory information from the storage module 530 and feed back the memory information to the control module 520. Then, the control module 520 may obtain, by using the memory information that is fed back, the at least one piece of processing result information corresponding to the processing of the input information, and transfer the at least one piece of processing result information to the output module 550.

The operation module 540 may be considered as a predefined tool library. The plug-in tool, the function tool, the interface tool, and the model tool described above may be included in the operation module 540.

In an example, when the AI agent 500 determines that the execution information includes the tool information, the AI agent 500 may invoke related tool information from the operation module 540 and feed back the tool information to the control module 520. Then, the control module 520 may obtain, by using the tool information that is fed back, the at least one piece of processing result information corresponding to the processing of the input information, and transfer the at least one piece of processing result information to the output module 550. It may be understood that although the large language model has excellent language understanding and generation capabilities, the large language model, like human, can solve very limited tasks without the help of any tool. When the AI agent 500 is given a capability of invoking tools, tasks such as completing a mathematical operation by using a calculator, completing data analysis by using python, and completing weather forecast by using a search engine can be implemented.

In an example, the output module 550 may execute step S208 in the method 200 shown in FIG. 2 or step S308 in the method 300 shown in FIG. 3.

The AI agent 500 according to this embodiment of the present disclosure can simply and effectively improve an intelligence degree, the flexibility, and the universality.

According to an embodiment of the present disclosure, an artificial intelligence-based information processing apparatus is further provided.

Figure 6:
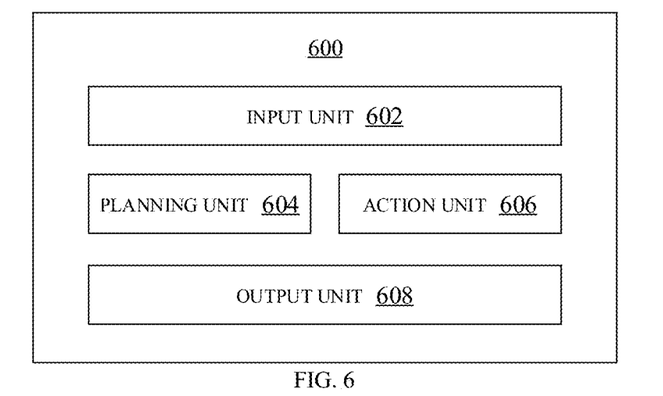
FIG. 6 is a block diagram of a structure of an artificial intelligence-based information processing apparatus according to an embodiment of the present disclosure.

FIG. 6 is a block diagram of a structure of an artificial intelligence-based information processing apparatus 600 according to an embodiment of the present disclosure.

As shown in FIG. 6, the apparatus 600 includes an input unit 602, a planning unit 604, an action unit 606, and an output unit 608.

The input unit 602 is configured to obtain input information to be processed.

The planning unit 604 is configured to determine execution information associated with processing of the input information. The execution information includes at least one of memory information to be retrieved or tool information to be invoked.

The action unit 606 is configured to obtain, by using the execution information, at least one piece of processing result information corresponding to the processing of the input information.

The output unit 608 is configured to integrate the at least one piece of processing result information to generate output information for feedback.

Operations of the input unit 602, the planning unit 604, the action unit 606, and the output unit 608 may respectively correspond to steps S202, S204, S206, and S208 shown in FIG. 2. Therefore, details of aspects of the operations are not described again herein.

Figure 7:
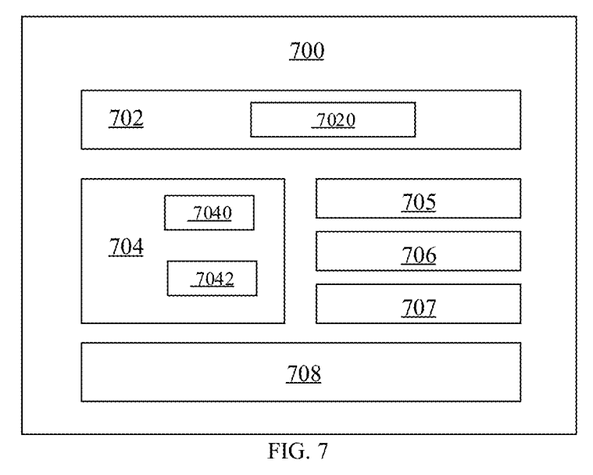
FIG. 7 is a block diagram of a structure of an artificial intelligence-based information processing apparatus according to another embodiment of the present disclosure.

FIG. 7 is a block diagram of a structure of an artificial intelligence-based information processing apparatus 700 according to another embodiment of the present disclosure.

As shown in FIG. 7, the apparatus 700 may include an input unit 702, a planning unit 704, an action unit 706, and an output unit 708. Operations of the input unit 702, the planning unit 704, the action unit 706, and the output unit 708 may be the same as those of the input unit 602, the planning unit 604, the action unit 606, and the output unit 608 shown in FIG. 6.

In some embodiments, the apparatus 700 may further include: an evaluation unit 705, configured to determine whether the at least one piece of processing result information meets a preset standard; and a reflection unit 707, configured to: in response to determining that the at least one piece of processing result information does not meet the preset standard, indicate the action unit 706 to re-obtain, by using the execution information, the at least one piece of processing result information corresponding to the processing of the input information.

In some embodiments, the input information may be multi-modal. The input unit 702 may include: a conversion unit 7020, configured to convert the multi-modal input information into a uniform information format.

In some embodiments, the planning unit 704 may include: a decomposition unit 7040, configured to determine, based on the input information, at least one task associated with the processing of the input information; and a thinking unit 7042, configured to: for each of the at least one task, determine whether the task needs to be processed based on the execution information; and in response to determining that the task needs to be processed based on the execution information, determine execution information corresponding to the task.

In some embodiments, the thinking unit 7042 may be further configured to: in response to determining that the task does not need to be processed based on the execution information, generate intermediate output information obtained by processing the task.

In some embodiments, the reflection unit 707 may be further configured to: in response to determining that the at least one piece of processing result information does not meet the preset standard, indicate the decomposition unit 7040 to redetermine, based on the input information, the at least one task associated with the processing of the input information.

In some embodiments, the memory information may include working memory information, and the working memory information is configured to be associated with the task currently being processed.

In some embodiments, the working memory information may be further configured to be associated with a processing status of each task of the at least one task.

In some embodiments, the memory information may include event memory information, and the event memory information is configured to be associated with a historical event.

In some embodiments, the memory information may include role memory information, and the role memory information is configured to be associated with a scenario to which the apparatus 700 is applied, so that the generated output information conforms to a style in the scenario.

In some embodiments, the memory information may include cognitive memory information, and the cognitive memory information is configured to be associated with a user who uses the apparatus 700, so that the generated output information conforms to a user profile of the user.

In some embodiments, the tool information may include: at least one of a plug-in tool, a function tool, an interface tool, or a model tool.

In some embodiments, the tool information may include a unified tool description specification.

In some embodiments, the apparatus 700 may be performed based on a reasoning capability of a large language model.

According to an embodiment of the present disclosure, an electronic device is further provided, including at least one processor; and a memory communicatively connected to the at least one processor, where the memory stores instructions executable by the at least one processor, and the instructions, when executed by the at least one processor, cause the at least one processor to perform the method described above.

According to an embodiment of the present disclosure, a non-transitory computer-readable storage medium storing computer instructions is further provided, where the computer instructions are used to cause a computer to perform the method described above.

According to an embodiment of the present disclosure, a computer program product is further provided, including a computer program, where the method described above is implemented when the computer program is executed by a processor.

Figure 8:
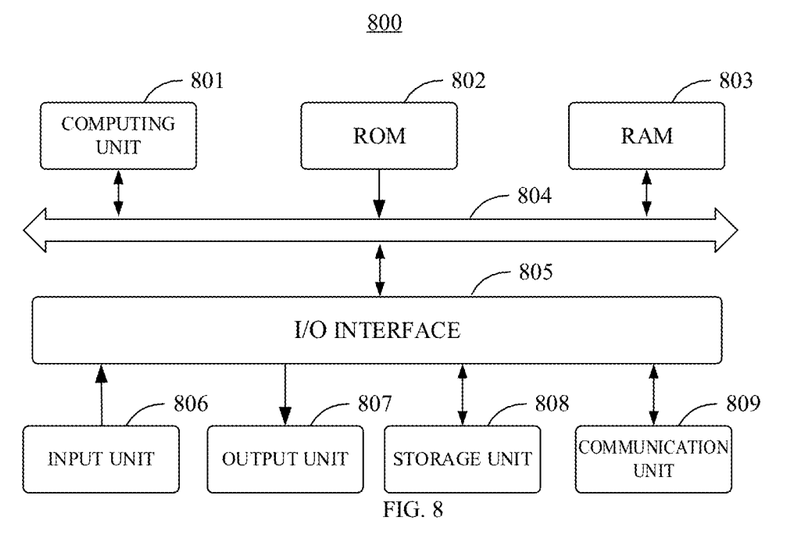
FIG. 8 is a block diagram of a structure of an example electronic device that can be used to implement an embodiment of the present disclosure.

FIG. 8 is a block diagram of a structure of an electronic device 800 that can be used as a server or client of the present disclosure, where the electronic device 800 is an example of a hardware device that can be applied to aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown in the present specification, their connections and relationships, and their functions are merely examples, and are not intended to limit the implementation of the present disclosure described and/or required herein.

As shown in FIG. 8, the electronic device 800 includes a computing unit 801, and the computing unit 801 may execute various proper actions and processing based on a computer program stored in a read-only memory (ROM) 802 or a computer program loaded from a storage unit 808 into a random access memory (RAM) 803. The RAM 803 may further store various programs and data required for an operation of the electronic device 800. The computing unit 801, the ROM 802, and the RAM 803 are connected to each other via a bus 804. An input/output (I/O) interface 805 is also connected to the bus 804.

A plurality of components in the electronic device 800 are connected to the I/O interface 805, including: an input unit 806, an output unit 807, a storage unit 808, and a communication unit 809. The input unit 806 may be any type of device that can input information to the electronic device 800. The input unit 806 may receive input digit or character information and generate key signal input related to user setting and/or function control of the electronic device, and may include but is not limited to a mouse, a keyboard, a touchscreen, a trackpad, a trackball, a joystick, a microphone, and/or a remote controller. The output unit 807 may be any type of device that can present information, and may include but is not limited to a display, a speaker, a video/audio output terminal, a vibrator, and/or a printer. The storage unit 808 may include but is not limited to a disk or an optical disk. The communication unit 809 allows the electronic device 800 to exchange information/data with another device by using a computer network such as the Internet and/or various telecommunication networks, and may include but is not limited to a modem, a network card, an infrared communication device, a wireless communication transceiver, and/or a chipset, such as a Bluetooth device, an 802.11 device, a Wi-Fi device, a WiMax device, and/or a cellular communication device.

The computing unit 801 may be any general-purpose and/or dedicated processing component with processing and computing capabilities. Some examples of the computing unit 801 include but are not limited to a central processing unit (CPU), a graphics processing unit (GPU), various dedicated artificial intelligence (AI) computing chips, various computing units that run machine learning model algorithms, a digital signal processor (DSP), any appropriate processor, controller, or microcontroller, and the like. The computing unit 801 executes the methods and processing described above. For example, in some embodiments, the method may be implemented as a computer software program, and may be tangibly included in a machine-readable medium, for example, the storage unit 808. In some embodiments, the computer program may be partially or completely loaded and/or installed on the electronic device 800 by using the ROM 802 and/or the communication unit 809. When the computer program is loaded to the RAM 803 and executed by the computing unit 801, one or more steps of the method described above may be performed. Alternatively, in another embodiment, the computing unit 801 may be configured in any other proper manner (for example, by using firmware) to execute the method described above.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: implementation in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other categories of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communication network) in any form or medium. Examples of the communication network include: a local area network (LAN), a wide area network (WAN), the Internet, and a blockchain network.

A computer system may include a client and a server. The client and the server are generally far away from each other and usually interact through a communication network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

In the technical solutions of the present disclosure, collection, storage, use, processing, transmission, provision, disclosure, etc. of user personal information involved all comply with related laws and regulations and are not against the public order and good morals.

Although the embodiments or examples of the present disclosure have been described with reference to the accompanying drawings, it should be appreciated that the method, system, and device described above are merely exemplary embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A computer-implemented method for processing information, comprising:
    obtaining input information to be processed;
    determining execution information associated with processing of the input information, wherein the execution information comprises at least one of memory information to be retrieved or tool information to be invoked, wherein the determining of the execution information comprises determining, based on the input information, at least one task associated with the processing of the input information;
    obtaining, by using the execution information, at least one piece of processing result information corresponding to the processing of the input information; and
    integrating the at least one piece of processing result information to generate output information for feedback;
    wherein the method further comprises:
    before the integrating of the at least one piece of processing result information, evaluating whether the at least one piece of processing result information meets a preset standard; and
    in response to evaluating that the at least one piece of processing result information does not meet the preset standard, redetermining at least one task associated with the processing of the input information and re-obtaining, by using the execution information, at least one new piece of processing result information corresponding to the processing of the input information, to correct the at least one piece of processing result information.

2. The method according to claim 1, wherein the input information is multi-modal, and wherein the obtaining input information to be processed comprises converting the multimodal input information into a uniform information format.

3. The method according to claim 1, wherein the determining execution information associated with the processing of the input information comprises:
for each task of the at least one task:
determining whether the task needs to be processed based on the execution information; and
in response to determining that the task needs to be processed based on the execution information, determining the execution information corresponding to the task.

4. The method according to claim 3, further comprising:
in response to determining that the task does not need to be processed based on the execution information, generating intermediate output information by processing the task.

5. The method according to claim 3, wherein the memory information comprises working memory information configured to be associated with the task currently being processed.

6. The method according to claim 5, wherein the working memory information is further configured to be associated with a processing status of each task of the at least one task.

7. The method according to claim 6, wherein the memory information comprises event memory information configured to be associated with a historical event.

8. The method according to claim 1, wherein the memory information comprises role memory information configured to be associated with a scenario to which the method is applied such that the generated output information conforms to a style in the scenario.

9. The method according to claim 1, wherein the memory information comprises cognitive memory information configured to be associated with a user to whom the method is applied such that the generated output information conforms to a user profile of the user.

10. The method according to claim 1, wherein the tool information comprises at least one of a plug-in tool, a function tool, an interface tool, or a model tool.

11. The method according to claim 10, wherein the tool information comprises a unified tool description specification.

12. The method according to claim 1, wherein the method is performed based on a reasoning capability of a large language model.

13. An electronic device, comprising:
at least one processor; and
a memory communicatively connected to the at least one processor,
wherein the memory stores instructions executable by the at least one processor, and the instructions, when executed by the at least one processor, cause the at least one processor to perform processing comprising:
obtaining input information to be processed;
determining execution information associated with processing of the input information, wherein the execution information comprises at least one of memory information to be retrieved or tool information to be invoked, wherein the determining of the execution information comprises determining, based on the input information, at least one task associated with the processing of the input information;
obtaining, by using the execution information, at least one piece of processing result information corresponding to the processing of the input information; and
integrating the at least one piece of processing result information to generate output information for feedback;
wherein the processing further comprises:
before the integrating of the at least one piece of processing result information, evaluating whether the at least one piece of processing result information meets a preset standard; and
in response to evaluating that the at least one piece of processing result information does not meet the preset standard, redetermining at least one task associated with the processing of the input information and re-obtaining, by using the execution information, at least one new piece of processing result information corresponding to the processing of the input information, to correct the at least one piece of processing result information.

14. The electronic device according to claim 13, wherein the determining execution information associated with the processing of the input information comprises:
for each task of the at least one task:
determining whether the task needs to be processed based on the execution information; and
in response to determining that the task needs to be processed based on the execution information, determining the execution information corresponding to the task.

15. The electronic device according to claim 14, wherein the memory information comprises working memory information configured to be associated with the task currently being processed.

16. The electronic device according to claim 13, wherein the memory information comprises role memory information configured to be associated with a scenario to which the processing is applied such that the generated output information conforms to a style in the scenario.

17. The electronic device according to claim 13, wherein the memory information comprises cognitive memory information configured to be associated with a user to whom the processing is applied such that the generated output information conforms to a user profile of the user.

18. A non-transitory computer-readable storage medium storing computer instructions, wherein the computer instructions are used to cause a computer to perform processing comprising:
obtaining input information to be processed;
determining execution information associated with processing of the input information, wherein the execution information comprises at least one of memory information to be retrieved or tool information to be invoked, wherein the determining of the execution information comprises determining, based on the input information, at least one task associated with the processing of the input information;
obtaining, by using the execution information, at least one piece of processing result information corresponding to the processing of the input information; and
integrating the at least one piece of processing result information to generate output information for feedback;
wherein the processing further comprises:
before the integrating of the at least one piece of processing result information, evaluating whether the at least one piece of processing result information meets a preset standard; and
in response to evaluating that the at least one piece of processing result information does not meet the preset standard, redetermining at least one task associated with the processing of the input information and re-obtaining, by using the execution information, at least one new piece of processing result information corresponding to the processing of the input information, to correct the at least one piece of processing result information.

\* \* \* \* \*